United States Patent [19]
Miyazaki

[11] Patent Number: 5,507,443
[45] Date of Patent: Apr. 16, 1996

[54] SPOOL FOR FISHING REEL

[75] Inventor: Takeo Miyazaki, Tokyo, Japan

[73] Assignee: Daiwa Seiko, Inc., Tokyo, Japan

[21] Appl. No.: 264,932

[22] Filed: Jun. 24, 1994

[30] Foreign Application Priority Data

Jun. 30, 1993 [JP] Japan ................. 5-041158 U

[51] Int. Cl.⁶ ............................................. H01K 89/015
[52] U.S. Cl. ............................................. 242/322
[58] Field of Search ................... 242/322, 587.1, 242/18 PN, 613

[56] References Cited

U.S. PATENT DOCUMENTS

| | | | |
|---|---|---|---|
| 842,551 | 1/1907 | Hunter | 242/322 X |
| 1,637,437 | 8/1927 | Case | 242/322 X |
| 1,761,750 | 6/1930 | Schafer | 242/322 X |
| 1,855,738 | 4/1932 | Case | 242/322 |
| 2,135,831 | 11/1938 | Nilsen | 242/587.1 X |
| 4,369,933 | 1/1983 | Bedenbaugh | 242/18 PW X |

FOREIGN PATENT DOCUMENTS 1063895 8/1959 Germany ................. 242/613

Primary Examiner—Joseph J. Hail, III
Attorney, Agent, or Firm—Longacre & White

[57] ABSTRACT

A spool is provided for use in a fishing reel in which a securing stepped portion is formed by a notch in the barrel of the spool instead of a pin or a through hole, and a knot portion of a fishing line is secured to the securing stepped portion to thereby reduce the working cost of the spool and maintain the strength thereof, while effectively using the fishing line wound round the outer periphery of the fishing line winding barrel portion of the spool.

9 Claims, 6 Drawing Sheets

SPOOL FOR FISHING REEL

BACKGROUND OF THE INVENTION

A) Field of the Invention

The present invention relates to a spool for use in a fishing reel for winding a fishing line which provides an arrangement for a spool required to retain an initial portion of a fishing line thereon.

B) Description of the Related Art

It is commonly known that before the initial winding of a fishing line onto a spool, an end of the fishing line is connected to a pin or a through hole formed in a winding barrel portion of the spool.

However, in the spool of the pin type as disclosed in Japanese Utility Model Publication No. 60-41164 of Showa, the fishing line can be hitched below the pin and thus the portion of the fishing line below the pine can be used wastefully. Also, there requires labor for drilling a hole and plating a pin, which results in the increased costs. Further, the pin may be deformed due to an external force and the like.

On the other hand, in the spool of the through hole type as disclosed in Japanese Utility Model Publication No. 63-173067 of Showa, since it is necessary to drill a hole in a spool shaft together with a barrel portion of the spool, there requires labor for such operation, which results in the increased costs. Also, the existence of the through hole can lower the strengths of the spool shaft and spool.

SUMMARY OF THE INVENTION

The present invention was made in order to solve the problems found in the prior arrangements. Accordingly, an objective of the present invention is to provide a simple and useful arrangement for a spool required to retain an initial portion of a fishing line thereon, thereby reducing a manufacturing and machining cost, securing the strength of the spool and enabling the efficient utility of the fishline.

To attain the above-noted and other objectives, the present invention provides a spool for a fishing reel, having a barrel portion onto which a fishline is to be wound, wherein the barrel portion is formed with a first notch defining a securing step adapted to engage with a knot formed on the fishline. Preferably, the first notch is L-shaped in section, and the securing step defines a planer wall substantially perpendicular to a fishing line play-out direction. The barrel portion may be formed with a second notch connected to the first notch and extended therefrom in a circumferential direction of the spool, the second notch receiving a portion of the fishing line in the vicinity of the knot.

DETAILED DESCRIPTION OF THE PREFERRED EMBODIMENTS

Figure 1:
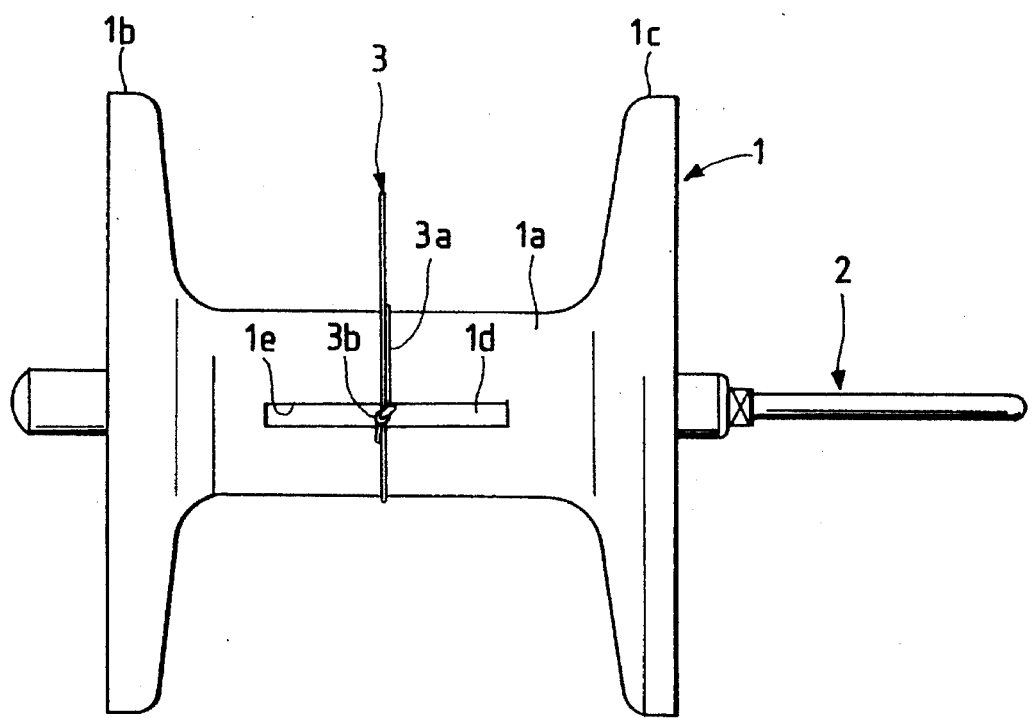
FIG. 1 is a plan view of a first embodiment of a spool according to the invention.
Figure 2:
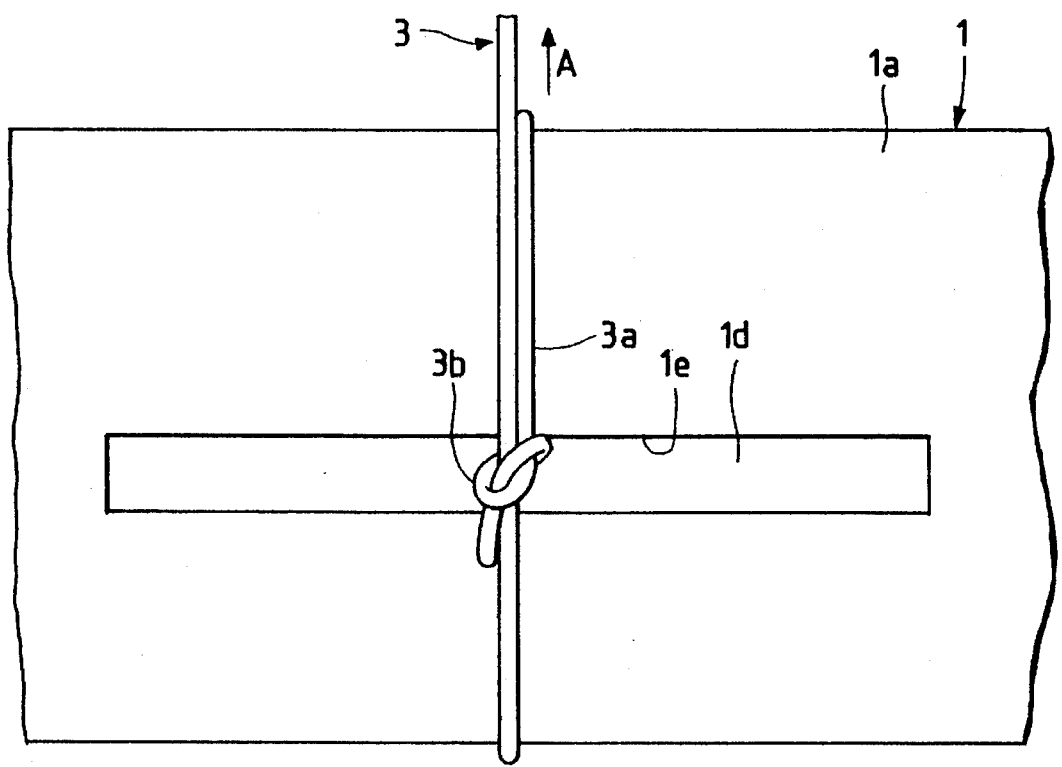
FIG. 2 is an enlarged plan view of the main portions of the fishing line winding barrel portion of the spool and a fishing line.
Figure 3:
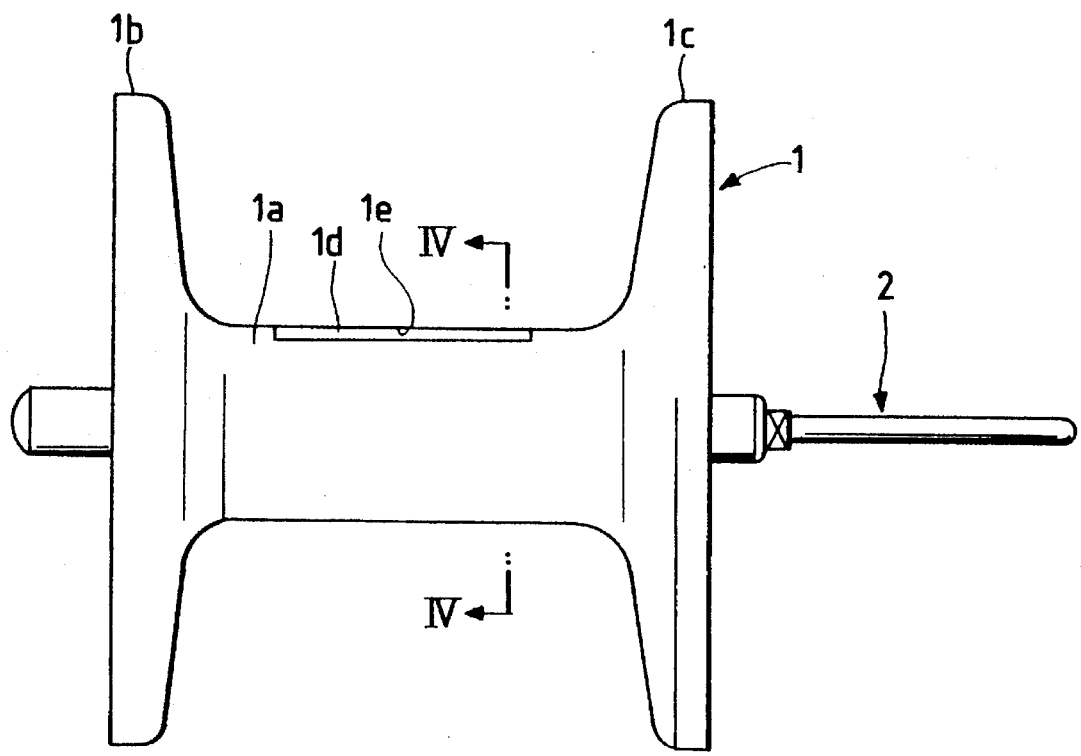
FIG. 3 is a back view of the above spool.
Figure 4:
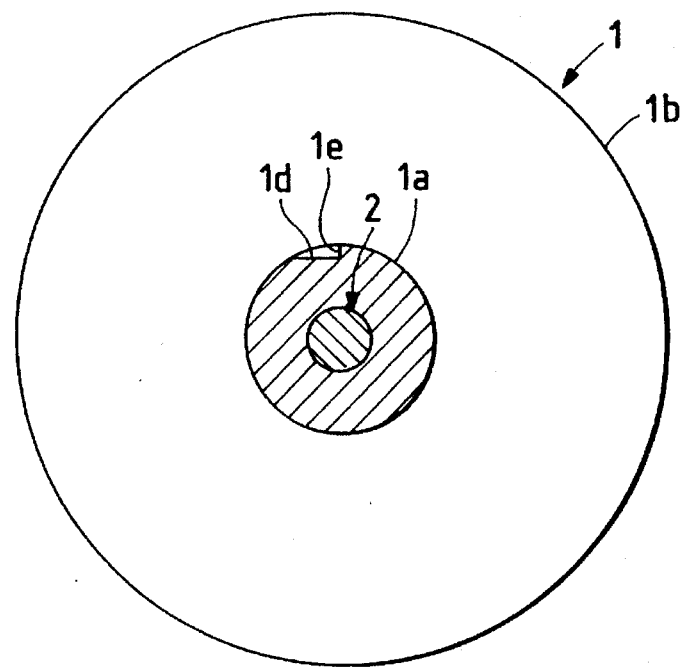
FIG. 4 is a sectional side view of the fishing line winding barrel portion of the spool taken along section line IV—IV of FIG. 3.

Now, description will be given below of the invention by way of the embodiments thereof shown in the accompanying drawings. In FIGS. 1 to 4, there is shown a first embodiment of a spool according to the invention which is applied to a dual-bearing type fishing reel. In particular, FIG. 1 is plan view of the spool, FIG. 2 is an enlarged plan view of the main portions of a fishing line winding barrel portion of the spool and a fishing line, FIG. 3 is a back view of the spool, and FIG. 4 is a sectional side view of the fishing line winding barrel portion of the spool shown in FIG. 3.

The spool 1 for a fishing reel, which is illustrated herein as the first embodiment, includes a fishing line winding barrel portion 1a and two flange portions 1b, 1c respectively disposed in the two side portions thereof, while a spool shaft 2 is fixed to the center of the spool 1.

A fishing line 3 is wound once round the outer periphery of the fishing line winding barrel portion 1a of the spool 1 and tied so as to form an annular portion 3a and a knot 3b.

In the outer peripheral surface of the fishing line winding barrel portion 1a, there is formed a notch 1d which is long in the axial direction of the spool 1 and has an L-like shape (see FIG. 4) when viewed from the side surface of the section thereof. One side 1e of the L-shaped notch 1d serves to form a securing step against the play-out direction of the fishing line 3 shown as arrow A in FIG. 2.

In addition, the notch 1d may be formed such that it is elongated in the fishing line play-out direction.

When the winding start portion of the fishing line 3 is secured to the outer periphery of the fishing line winding barrel portion 1a of the spool 1, the fishing line 3 is wound once thereround, and then tied so as to form the annular portion 3a and knot 3b. The knot 3b is preferably oriented such that, as shown in FIGS. 1 and 2, the forwardly located part of the knot 3b, rather than the backwardly located part, is located below the fishing line and is brought into abutment with the securing stepped portion 1e. The fishing line, which has passed through the knot 3b, is drawn out in the play-out direction.

In this state, when the fishing line passed through the knot 3b is pulled, the annular portion 3a is closed tight and tightened in the outer peripheral direction of the fishing line winding barrel portion 1a so as to secure the abutment of the knot 3b against the securing stepped portion 1e of the spool 1, whereby the rotation of the annular portion 3a round the outer periphery of the fishing line winding barrel portion 1a is prevented.

After the knot 3b is secured in this matter, if the spool 1 is rotated in the fishing line winding direction, then the fishing line 3 is wound round the outer periphery of the fishing line winding barrel portion 1a of the spool.

As described above, according to the first embodiment of the invention, the securing stepped portion 1e is formed by the notch 1d in the outer peripheral surface of the fishing line winding barrel portion 1a of the spool 1 and the knot 3b of the fishing line 3 is to be secured to the securing stepped portion 1e, so that the winding start portion of the fishing line 3 can be secured. This eliminates the needs to implant a pin and to open up a through hole, which can reduce the working costs of the spool.

Also, the structure of the first embodiment makes it possible to make effective use of the whole of the fishing line 3 except the annular portion 3a wound once round the outer periphery of the fishing line winding barrel portion 1a.

Further, since the notch 1d is small in size, there is eliminated the possibility that the notch 1d can worsen the strength of the spool.

When the spool for a fishing reel is structured in the above-mentioned manner, the working cost thereof can be reduced, the whole of the fishing line 3 except the annular portion 3a wound once round the outer periphery of the fishing line winding barrel portion 1a can be used effectively, and, the existence of the notch 1d cannot worsen the strength of the spool because it is small in size.

Figure 5:
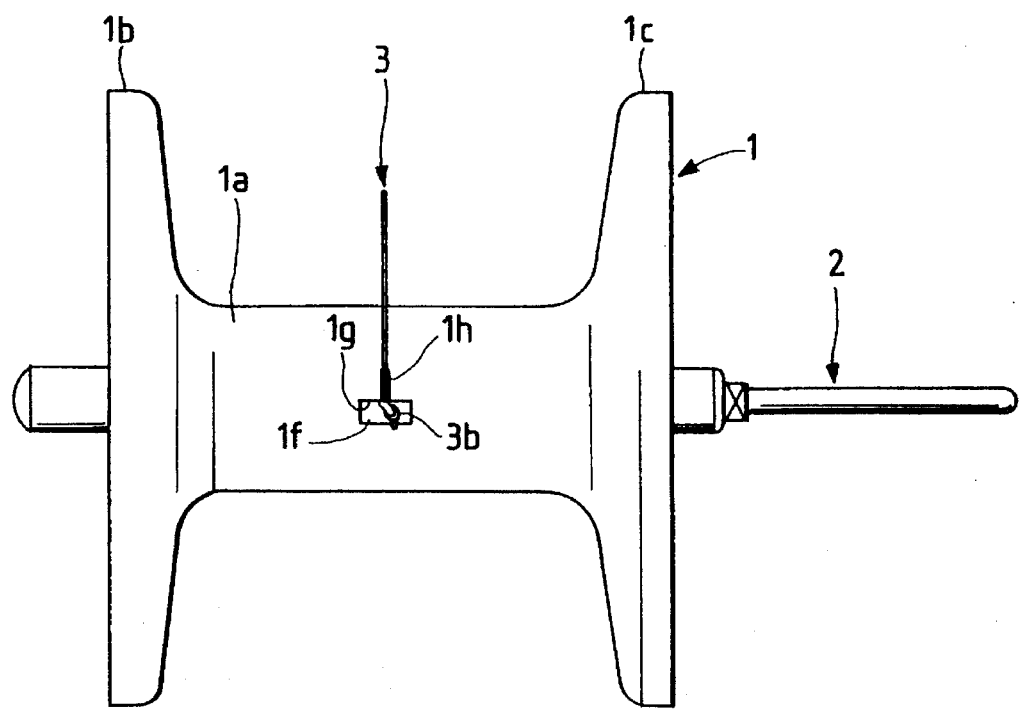
FIG. 5 is a plan view of a second embodiment of a spool according to the invention.
Figure 6:
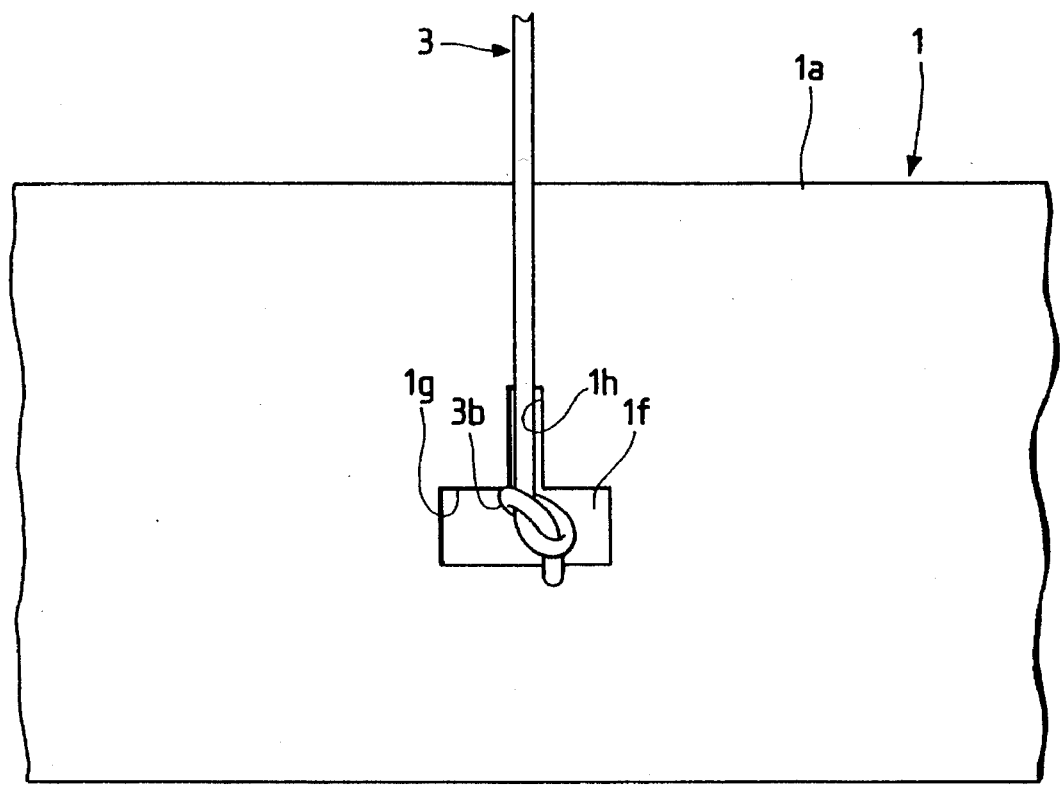
FIG. 6 is an enlarged plan view of the main portions of the fishing line winding barrel portion of the spool and a fishing line.
Figure 7:
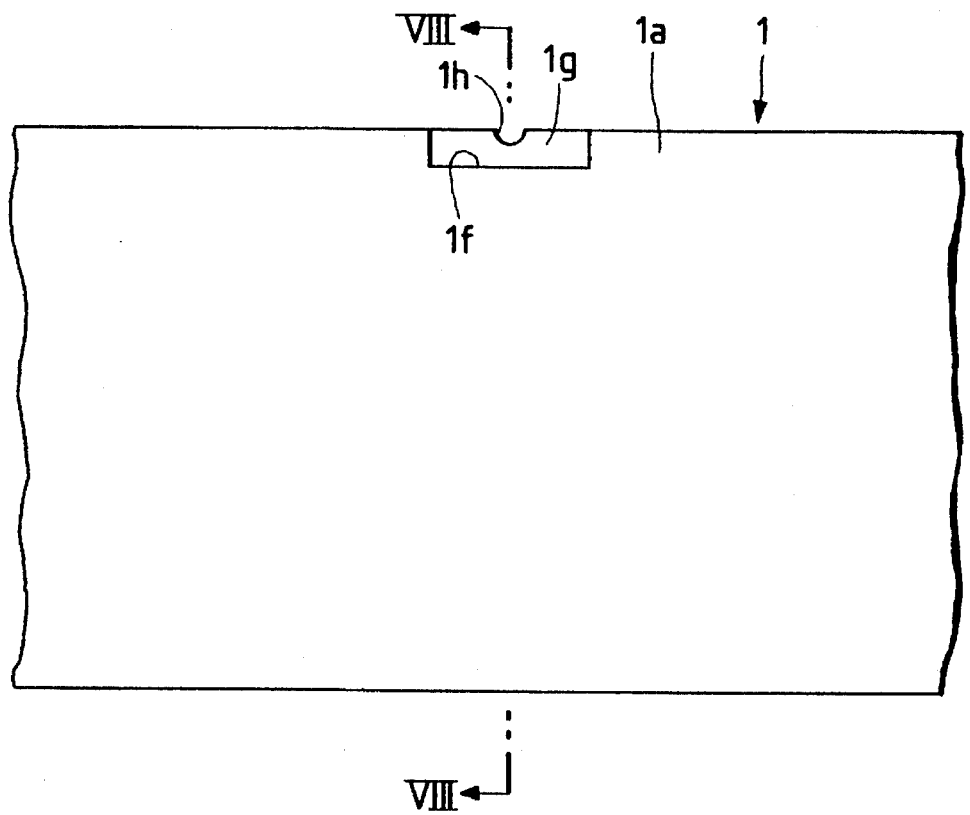
FIG. 7 is an enlarged back view of the main portions of the fishing line winding barrel portion of the spool.
Figure 8:
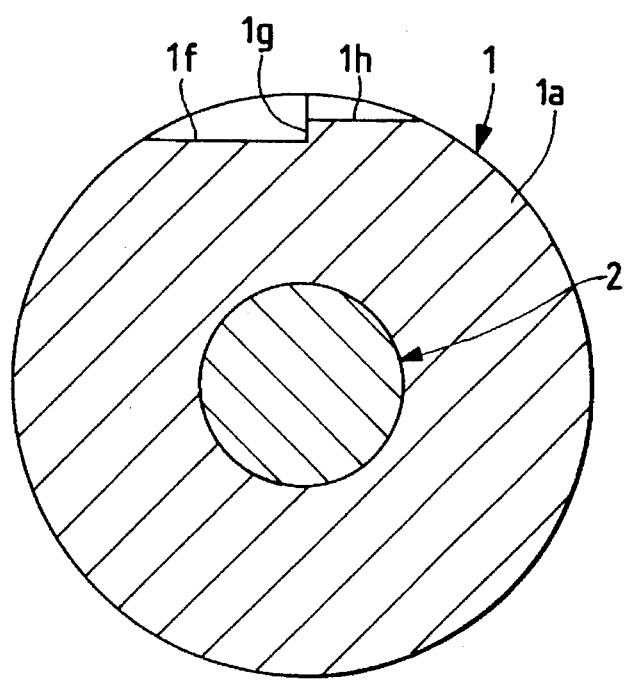
FIG. 8 is an enlarged sectional side view of the fishing line winding barrel portion of the spool taken along section line VIII—VIII of FIG. 7.

Now, referring to FIGS. 5 to 8, there is shown a second embodiment of spool according to the invention, which spool is applied to a dual-bearing type fishing reel. In particular, FIG. 5 is a plan view of the spool, FIG. 6 is an enlarged plan view of the main portions of the fishing line winding barrel portion of the spool and a fishing line, FIG. 7 is an enlarged back view of the main portions of the fishing line winding barrel portion of the spool, and FIG. 8 is an enlarged sectional side view of the fishing line winding barrel portion of the spool shown in FIG. 7.

The spool for a fishing reel according to the second embodiment, similarly to the first embodiment, includes a fishing line winding barrel portion 1a and two flange portions 1b, 1c, while a spool shaft 2 is fixed to the center of the spool.

At arbitrary portion on the outer peripheral surface of the fishing line winding barrel portion 1a, there is formed a notch if which has an L-like shape when viewed from the side surface of the section thereof, while the longitudinal side 1g of the notch if is used as a securing stepped portion with respect to the play-out direction of the fishing line 3.

Continuously with the notch 1f, there is formed a notch 1h which extends from the securing stepped portion 1g in the fishing line play-out direction to allow the fishing line 3 to enter therein.

When the winding start portion of the fishing line 3 is secured to the outer periphery of the fishing line winding barrel portion 1a of the spool 1, the knot 3b is first formed in the fishing line 3.

In this embodiment as well, preferably, the knot 3b may be formed such that forwardly located portion of the knot 3b is located nearer to the barrel portion 1a and brought into abutment with the securing stepped portion 1g, as shown in FIGS. 5 and 6.

The portion of the fishing line 3 existing in front of the knot 3b is inserted into the notch 1h and the knot 3b is inserted into the notch 1f.

If the spool 1 is rotated in the fishing line winding direction, then the knot 3b is secured to the securing stepped portion 1g an the fishing line 3 is wound round the outer periphery of the fishing line winding barrel portion 1a.

If the securing stepped portion 1g is formed by a notch 1f on the outer peripheral surface of the fishing line winding barrel portion 1a of the spool 1 and the notch 1h, which continues with the notch 1f and allows the fishing line 3 to enter therein, is formed in the above-mentioned manner, then the knot 3b of the fishing line 3 is secured to the securing stepped portion 1g. And, if the fishing line 3 in the play-out direction is inserted into the notch 1h, then the knot 3b of the fishing line 3 can be positively secured to the securing stepped portion 1g.

Also, according to the second embodiment, since the winding start portion of the fishing line 3 is secured by means of the securing stepped portion 1g, the need to implant a pin and to open up a hole, which can reduce the working costs of the spool, is eliminated.

Further, because the recesses 1f and 1h are small in size, the strength of the spool is not compromised.

Figure 9:
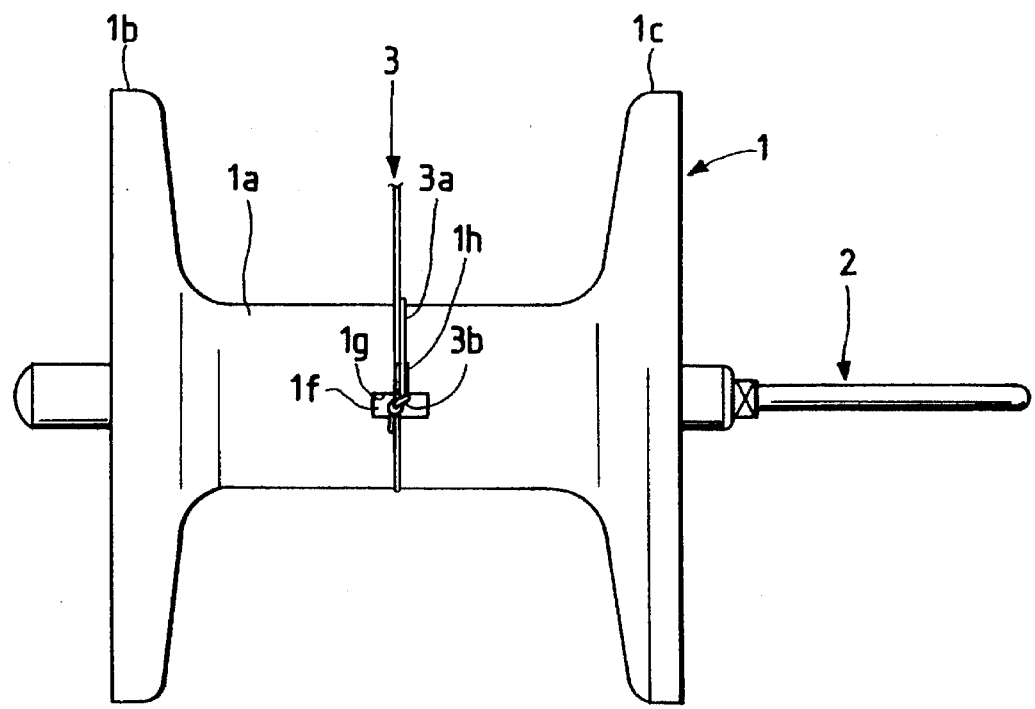
FIG. 9 is a plan view of an applied embodiment of a spool according to the invention.
Figure 10:
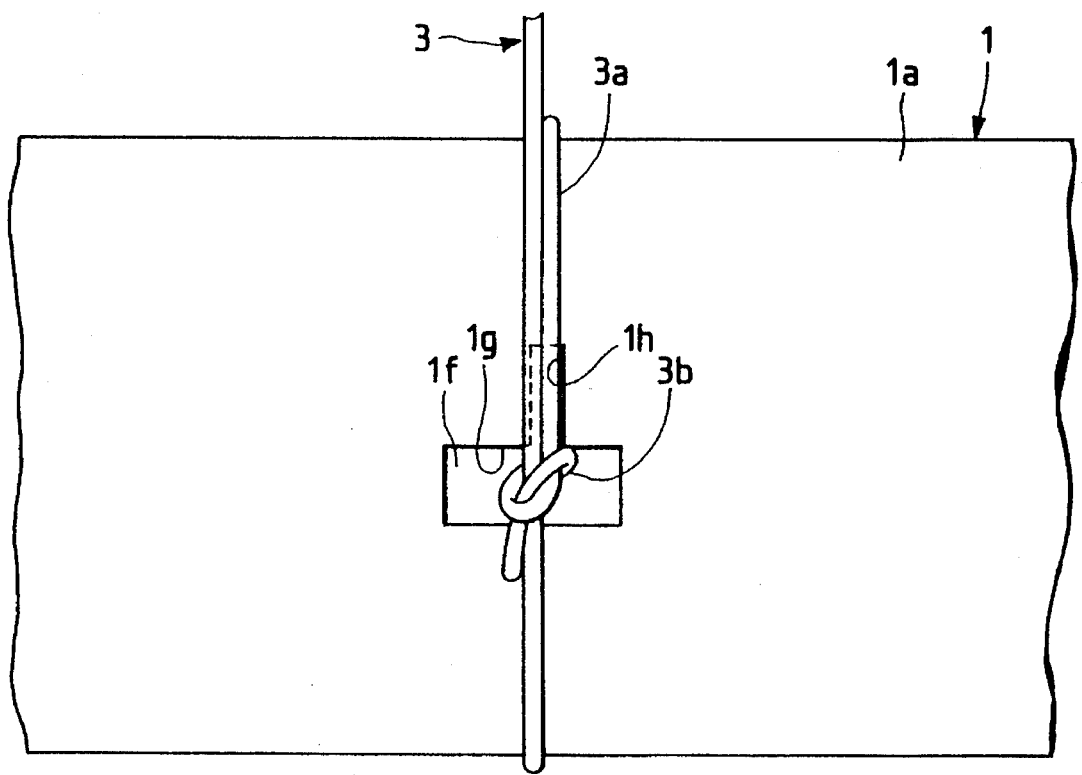
FIG. 10 is an enlarged plan view of the main portions of the fishing line winding barrel portion of the spool.

Now, referring to FIGS. 9 and 10, another way for securing the fishing line 3 to the barrel portion 1a is explained.

In FIGS. 9 and 10, there are used the spool 1 of the second embodiment, and a fishing line 3 which, similarly to the first embodiment, includes an annular portions 3a and a knot 3b.

When the winding start portion of the fishing line 3 is secured to the outer periphery of the fishing line winding barrel portion 1a of the spool 1, the fishing line 3 is wound once to thereby form the annular portion 3a and knot 3b.

In this state, the portion of the fishing line 3 existing in front of the knot 3b is inserted into the notch 1h and the knot 3b is inserted into the notch 1f.

Next, if the annular portion 3a is tightened in the direction of the fishing line winding barrel portion 1a of the spool 1 and the fishing line 3 is pulled in the play-out direction, then the knot 3b portion of the fishing line 3 is abutted against the securing stepped portion 1g of the spool 1, and the annular portion 3a of the fishing line 3 is prevented from being rotated round the outer periphery of the fishing line winding barrel portion 1a of the spool 1.

After the annular portion 3a is secured in this manner, if the spool 1 is rotated in the fishing line winding direction, the fishing line 3 is wound round the outer periphery of the fishing line winding barrel portion 1a.

Figure 11:
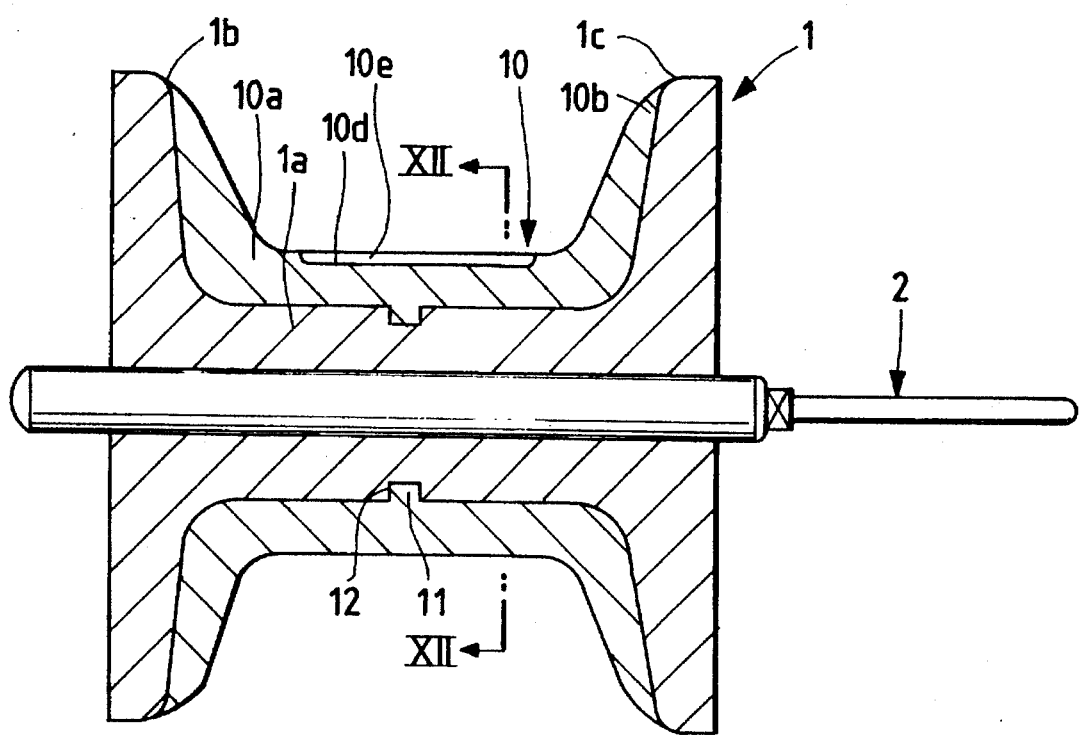
FIG. 11 is a sectional back view of a spool and an economizer showing a modification of the first embodiment of the invention.
Figure 12:
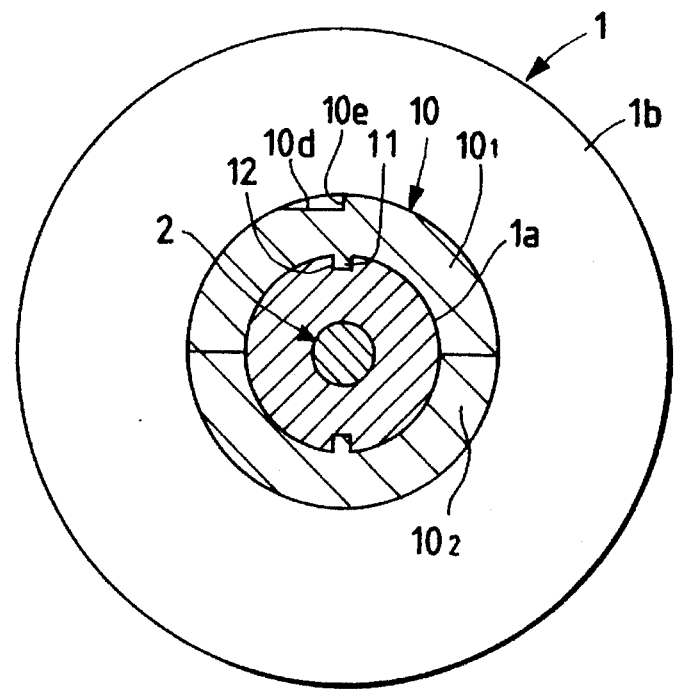
FIG. 12 is a sectional side view of the spool and the economizer taken along section line XII—XII of FIG. 11.

In addition, the fishing line retainment structure of the present invention may be applied to an economizer fitted around a barrel portion of a spool. FIGS. 11 and 12 show an example of such modification, wherein a notch 10d and a securing step portion 10e identical in configuration to the notch 1d and the securing step portion 1e of the first embodiment are formed on an outer periphery of a fishing line winding barrel portion 10a of an economizer 10 which is attached on the outer periphery of the spool 1 to adjust an initial fishing line winding diameter as desired. The economizer 10 is generally made up of a pair of mating semi-cylindrical parts $10_1$ and $10_2$ coupled to each other. When the semi-cylindrical parts $10_1$ and $10_2$ are coupled to each other around the outer periphery of the spool 1, the relative rotation between the economizer 10 and the spool 1 are prevented by the engagement of the internal projections 11 of the economizer 10 with the recesses 12 of the spool. Preferably, the economizer 10 is made from elastic material, so that when the economizer 10 is mounted on the spool 1, flange portions 10*b* of the economizer 10 are elastically deformed axially inwardly. In this case, the elastic restoring force provides the tight contact between an axially outer surface of the flange 10*b* and an axially inner surface of the flange 1*b*.

In the above description, the knot 3*b* portion is directly abutted against the securing stepped portion. However, this is not limitative but, alternatively, a small metal ring or a small synthetic resin ring may be inserted into the portion of the fishing line 3 existing in front of the knot 3*b*, and then the knot 3*b* portion may be abutted against the securing stepped portion through the ring.

Also, in the above description, the spool 1 for use in a fishing reel is assumed to be a spool for use in a dual-bearing type fishing reel. However, this is not limitative but the spool 1 for a fishing reel may be applied to a spool for use in other types of fishing reels such as a spinning reel for fishing. Depending on the reel type being used, it is noted that the stepped portion 1*e* is formed transverse to the play-out direction of the fishline so as to abut a knot formed therein in a securing manner.

Due to the fact that the spool of the invention is structured in the above-mentioned manner, the working cost of the spool can be reduced and the fishing line wound round the outer periphery of the fishing line winding barrel portion of the fishing line can be used effectively. Also, since the notches are small in size, there is no possibility that the strength of the spool can be lowered. That is, the invention can supply a spool for use in a fishing reel which provides excellent effects in practical use.

What is claimed is:

1. A combination of fishline and a spool mounted for rotation about an axis on a fishing reel, said spool having a barrel portion and said fishline is wound onto an exterior surface of said barrel portion, wherein said exterior surface of said barrel portion is formed with a first notch defining a securing step engaging a knot formed on the fishline; and wherein said securing step defines a planar wall lying on a plane which is substantially collinear with a radial direction of said axis and substantially perpendicular to a fishline play-out direction, said planar wall abutting said knot to secure said fishline to said exterior surface of said barrel portion.

2. The spool according to claim 1, wherein said first notch is elongated in an axial direction of said spool.

3. The spool according to claim 1, wherein said barrel portion is formed with a second notch connected to said first notch and extended therefrom in a circumferential direction of said spool, said second notch receiving a portion of said fishing line in the vicinity of said knot.

4. The spool according to claim 1, wherein said first notch defines an L-shaped surface recessed into the barrel portion.

5. A combination of fishline and a spool for a fishing reel having a barrel portion onto which said fishline is wound, said fishline being unwound from said barrel portion in a playout direction, wherein said barrel portion comprises a stepped recess adapted to receive a portion of a knot formed in said fishline, wherein said stepped recess defines an abutting surface extending transverse to said playout direction and abutting said knot;

and wherein said barrel portion is further formed with a groove portion extending from said stepped recess in a circumferential direction of said spool, said groove portion having a width larger than a diameter of said fishline to receive said fishline, said width being smaller than said knot to prevent said knot from passing from said stepped recess through said groove.

6. The spool according to claim 5, wherein said abutting surface extends in a radial direction of said barrel portion.

7. The spool according to claim 5, wherein said abutting surface extends in a direction parallel to a radial direction of said barrel portion.

8. The spool according to claim 5, wherein said stepped recess is elongated in an axial direction of said spool.

9. The spool according to claim 5, wherein said stepped recess is L-shaped when viewed in section.

\* \* \* \* \*